United States Patent [19]

Petrov et al.

[11] 4,314,256

[45] Feb. 2, 1982

[54] RADIATION-SENSITIVE MATERIAL AND METHOD FOR RECORDING INFORMATION ON RADIATION-SENSITIVE MATERIAL

[76] Inventors: Vyacheslav V. Petrov, prospekt Vernadskogo, 85, kv. 55; Andrei A. Krjuchin, ulitsa Studencheskaya, 12/14, kv. 43, both of Kiev, U.S.S.R.

[21] Appl. No.: 47,924

[22] Filed: Jun. 12, 1979

[51] Int. Cl.$^3$ ........................................... G01D 15/34
[52] U.S. Cl. ................................. 346/1.1; 346/135.1; 430/945
[58] Field of Search ................... 346/135.1, 76 L, 1.1; 430/64, 945, 502, 526, 524, 346, 495, 942

[56] References Cited

U.S. PATENT DOCUMENTS

| | | | |
|---|---|---|---|
| 3,637,381 | 1/1972 | Hallman | 430/297 |
| 3,740,761 | 6/1973 | Fechter | 346/135.1 |
| 3,959,799 | 5/1976 | Gambino | 346/135.1 X |
| 3,996,054 | 12/1976 | Kawaziri | 430/526 X |

*Primary Examiner*—Joseph W. Hartary

*Attorney, Agent, or Firm*—McAulay, Fields, Fisher, Goldstein & Nissen

[57] ABSTRACT

A radiation-sensitive material comprising a metallic layer, an inorganic material layer, and a separation layer disposed between the metallic layer and the inorganic material layer and made from a material inert relative to these layers. The thickness of the separation layer is sufficient to interaction between the metallic layer and the inorganic material layer when said radiation material is exposed to actinic radiation having a power density lower than a threshold value required for causing a local breakdown of the separation layer. A method for recording information on a radiation-sensitive material of the above type, comprising irradiation of said material by pulses of electromagnetic or corpuscular radiation of a duration from $10^{-6}$ to $10^{-8}$ s with the energy density in the area exposed to radiation being not less than 5.10 J/cm$^2$, said pulses being capable of producing between the metallic layer and the inorganic material layer in the exposed area of the radiation sensitive material a potential difference so as to cause an electric breakdown of the separation layer in said area.

2 Claims, 4 Drawing Figures

RADIATION-SENSITIVE MATERIAL AND METHOD FOR RECORDING INFORMATION ON RADIATION-SENSITIVE MATERIAL

BACKGROUND OF THE INVENTION

1. Field of the Invention

The present invention relates to means of recording information, and more particularly to radiation-sensitive materials and methods of recording information on these materials.

Hereinafter by a radiation-sensitive material is meant a material sensitive to electromagnetic and corpuscular radiation.

The proposed material and method can be employed for recording binary information in memory units of electronic computers, in video-recording equipment, laser recording devices and other information recording means.

2. Description of the Prior Art

Methods of recording information by means of electromagnetic and corpuscular radiation are widely known. Among the materials for carrying out these methods there is known a sensitive element (cf. U.S. Pat. No. 3,637,381) comprising a metallic layer and an inorganic material layer deposited thereon and capable of forming interaction products therewith when exposed to electromagnetic actinic radiation, said interaction products having physical and chemical properties different from those of the metallic layer and of the inorganic material layer. In this case, as a result of such interaction there occurs etching of the metallic layer.

Recording information upon the above element is done by exposing the element to actinic radiation within the time sufficient for the complete reaction process, the amount of the interaction product being proportional to the duration of exposure and the intensity of radiation.

Due to a continuous partial interaction between the inorganic material and the metallic layer the above element has a low chemical stability even without being exposed to radiation, if the inorganic layer is a layer of a semiconductor with a width of the forbidden band of over 2 eV, i.e. a semiconductor which provides a high sensitivity of the element and a wide range of its spectral sensitivity. In addition, this element integrates the impinging irradiation corresponding to the range of a proper absorption of the inorganic layer. Because of a low reliability of the recorded information storage and a low fidelity of the information readout resulting from these disadvantages, the above sensitive element is not suitable as an information carrier in the devices wherein information is recorded and read out either by electromagnetic or corpuscular radiation.

The number of readouts from the information carrier made from the above sensitive element is also limited, and therefore the power density of the radiation for reading information should be much lower than that of the recording radiation, which, in turn, reduces a signal-to-noise ratio while reproducing the information.

There is known a method of recording information upon a radiation-sensitive element by electromagnetic irradiation (cf. Japanese Patent No. 49-81036, N. Cl. 103 KO) which is characterized in that the radiation-sensitive element, after being exposed to electromagnetic radiation, is subjected to a thermal treatment.

There is also known a material for carrying out this method, comprising a metallic layer made from silver, or copper, or nickel, or thallium, an inorganic material layer made from antimony chalcogenide, or bismuth chalcogenide, or arsenic chalcogenide, and a separation layer disposed between the two first layers and made from a material which is inert with respect to said layers. Generally, the metallic layer is deposited on a radiation transparent support backing. Over the metallic layer there are deposited in succession a separation layer and an inorganic material layer capable of interacting with the metallic layer to form the interaction products when exposed to actinic radiation, said interaction products having physical and chemical properties different from those of the metallic layer and the inorganic material layer.

The usual materials used for the metallic layer are silver, copper, nickel, tellurium, gallium, aluminum, bismuth, gold, cadmium, chromium.

The materials which are used for the inorganic layer are halogenides, dioxides, arsenides, selenides, tellurides, binary and ternary systems of chalcogenide arsenic glass, antimony, bismuth.

The separation layer of this radiation-sensitive material is formed from inorganic materials, for instance, arsenic trisulfide.

The above radiation-sensitive material features a high stability of chemical properties during a long-term storage for the metallic layer is in contact with a semiconductor having a small width of the forbidden band. However, this high stability of chemical properties is manifested only if said sensitive material is not exposed to actinic radiation. Otherwise, i.e. under the action of actinic radiation of even a low intensity the structure of said radiation-sensitive material changes masking the useful information. This, in turn, results in a lower reliability of the information storage and makes it necessary, while reading out information, to decrease the radiation power density by several orders as compared with the radiation power density required for recording information, which affects the fidelity of the read-out thereof.

It is quite natural that these disadvantages of the above sensitive element present certain difficulties when it is utilized as an information carrier. Moreover, the necessity of thermal treatment thereof leads to an increased consumption of energy.

SUMMARY OF THE INVENTION

The principal object of this invention is to provide a radiation-sensitive material enhancing the reliability of storing recorded information.

Another object of the present invention is to provide a method for recording information on the radiation-sensitive material.

Still another object of the present invention is to enhance the fidelity of reading out recorded information.

A further object of the present invention is to reduce consumption of energy required for recording information.

This and other objects of the invention are attained in a radiation-sensitive material incorporating a metallic layer made from silver, or copper, or nickel, or thallium or their alloys, an inorganic material layer made from arsenic chalcogenide, or antimony chalcogenide, or bismuth chalcogenide, and a separation layer disposed between the metallic layer and the inorganic material layer, and mode from a material inert to these layers, wherein, according to the invention, the separation layer has a thickness sufficient for preventing the metallic layer from interacting with the inorganic material layer when the radiation-sensitive material is exposed to electromagnetic or corpuscular radiation having an energy density lower than a threshold value required for a local breakdown of the separation layer.

The presence of the separation layer in the radiation-sensitive material for recording binary information improves the reliability of storing recorded information which is not masked by the incident radiation because the separation layer serves as a "barrier" which can be destroyed only by pulses having a sufficient energy to do so.

It is expedient that the separation layer be 50 to 300 Å thick and made from As, or Sb, or Si, or Ge, or their oxides, or metallic oxides of such metals as Al, Ti, V, Fe or polyorganosiloxane films.

An alternative embodiment of the radiation-sensitive material is also possible, wherein the separation layer is from 20 to 100 Å thick and comprises a metal of a secondary subgroup of the third group, or of a secondary subgroup of the fourth group, or of a secondary subgroup of the fifth group, or of a secondary subgroup of the sixth group of the periodic system, or one of the platinum metals, or bismuth.

This and other objects of the invention are also attained in a method for recording information on a radiation-sensitive material incorporating a metallic layer, an inorganic material layer and a separation layer disposed between said layers, comprising actinic irradiation of the radiation-sensitive material, wherein according to the invention said irradiation is effected by electromagnetic or corpuscular radiation pulses of a duration from $10^{-6}$ to $10^{-8}$ sec, with the energy density in the area exposed to radiation being not less than $5.10^{-2}$ J/cm$^2$ so as to produce in said area of the radiation-sensitive material between the metallic layer and the inorganic material layer a potential difference capable of causing an electric breakdown of the separation layer in said area.

Recording information by the electric breakdown of the separation layer makes it possible to utilize as information carriers such radiation-sensitive materials the separation layer of which has a sufficient thickness to prevent the interaction between the other layers which it separates, thereby precluding distortion of the recorded information during a long-term storage thereof when the material is impinged upon by an actinic radiation having an energy density lower than a threshold value sufficient for causing a local destruction of the separation layer, i.e. by direct or incident sun light.

It is expedient that the information be recorded by pulses of electromagnetic or corpuscular radiation of a duration from $10^{-6}$ to $10^{-8}$ s, with the energy density in the area exposed to radiation being not lower than $5.10^{-2}$ J/cm$^2$.

Recording information by such pulses makes it possible to quickly and reliably record and reproduce information with a high degree of fidelity. A long-term storage of the information recorded by such pulses is also possible provided the information carrier is exposed to actinic radiation having an energy density lower than $5.10^{-4}$ W/cm$^2$.

The proposed method of recording information on a radiation-sensitive material and the radiation-sensitive material for carrying out this method improve the reliability of storing recorded information. The proposed technical solution also enhances the fidelity of reading out the information as well as reduces energy consumption for recording.

DETAILED DESCRIPTION OF THE INVENTION

These and other objects and advantages will become apparent from the following detailed description.

In the embodiments of the invention described hereinbelow binary information was recorded upon radiation-sensitive materials by pulses of electromagnetic radiation. The radiation-sensitive material was deposited on a transparent support backing. For carrying out the proposed method of recording information there was utilized a material comprising a support backing 4, a metallic layer 1, a separation layer 2 and an inorganic material layer 3. Said layers may be arranged in the material so that the inorganic material layer will be deposited on the support backing. The support backing may be made from glass, quartz, polished metallic plates and flexible organic films.

The metallic layer may be made from nickel, silver, copper, thallium or their alloys capable of providing a high sensitivity of the radiation-sensitive material. To obtain a highly sensitive material the metallic layer thickness should be within the range from 400 to 10,000 Å.

The inorganic material layer may be made of compounds or alloys such as As-S, As-Se, As-S-Se, Sb-S, Sb-Se, Sb-S-Se, Bi-S, Bi-Se, Bi-S-Se and the like materials. To obtain a highly sensitive material the thickness of the inorganic material layer should be within the range from 100 to 5,000 Å.

Figure 3:
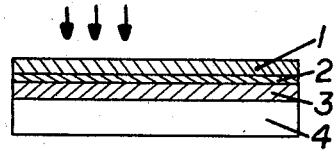
FIG. 3 shows the material of FIG. 1 being exposed to low intensity electromagnetic radiation.
Figure 4:
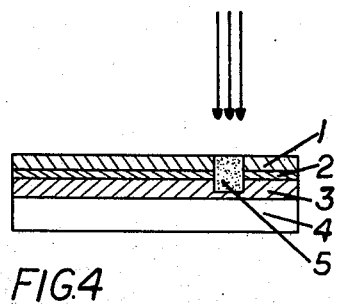
FIG. 4 shows the result of focused electromagnetic radiation on the material of FIG. 1.

When such radiation-sensitive material is exposed to actinic (electromagnetic or corpuscular) radiation, both in the inorganic material layer and in the metallic layer there is formed a space charge causing a potential difference between the above-mentioned layers. When the recording pulse duration is from $10^{-6}$ to $10^{-8}$ s, charge relaxation from the radiation area does not occur and the charge accumulated in the material causes a local destruction of the separation layer as a result of an electric breakdown thereof in the area exposed to radiation. As illustrated in FIG. 4, breakdown of the separation layer 2 creates conditions for interaction between the metallic layer 3 and the inorganic material layer 1, resulting in the formation of an interaction product 5 between said layers, said interaction product having physical and chemical properties different from those of the metallic layer and of the inorganic material layer, which causes the reflection factor of the exposed area of the material to change. The difference between the reflection factors of the exposed and unexposed areas of the material makes it possible to record binary information on the material of said type by the above method. As shown in FIG. 3, the radiation sensitive material according to the invention is not affected by low intensity electromagnetic radiation.

The thickness of the separation layer considerably influences the properties of the material sensitive to electromagnetic and corpuscular radiation so that by changing it a material with new qualitative characteristics can be obtained.

In the case of small thickness of the separation layer (up to 20 Å for metals and up to 50 Å for dielectrics and As, Sb, Si, Ge), the metal being irradiated diffuses through the separation layer from the metallic layer to the inorganic material layer, This process has an integral character, i.e. the changes produced by light pulses of small intensity are accumulated inside the material. With the formation of a continuous separation layer the sensitivity effect of such materials is determined not by a slow diffusion of metal through the separation layer under actinic radiation but by the destruction of the separation layer due to the occurrence of a space charge and electric breakdown caused thereby in the area exposed to radiation.

With the increase of the thickness of the separation layer (for metals more than 100 Å and for metal oxides, polyorganosiloxane films, which may be made, for example, of polymethylsiloxane, polyethylsiloxane, polyhexaethyldisiloxane, As, Sb, Si, Ge, more than 300 Å) the sensitivity of the material decreases. The decrease of the material sensitivity, in turn, leads to the necessity of increasing the pulse energy for recording, which causes a thermal destruction of the radiation-sensitive material.

EXAMPLE 1

Figure 2:
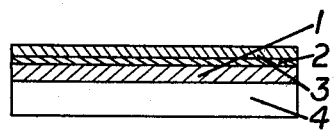
FIG. 2 is a cross-sectional view of another embodiment of a radiation-sensitive material according to the invention.

The radiation-sensitive material comprises a support backing 3 mm thick made of hot-polished glass, and disposed in succession thereover an inorganic material layer 300 Å thick made of arsenic chalcogenide (an alloy $AsS_2$), a separation layer 50 Å thick made of germanium monoxide GeO, and a metallic layer made of silver, 3,000 Å thick. The radiation-sensitive material was prepared as follows and is illustrated in FIG. 2: upon the preliminarily cleaned support backing 4, by means of thermal evaporation at a pressure of $2.10^{-5}$ mm Hg, there were deposited in succession the inorganic material layer 1, the separation layer 2 and the metallic layer 3.

The energy density required for recording a binary unit upon the proposed material is from $5.10^{-2}$ to $10^{-1}$ J/cm$^2$ with a pulse duration of actinic radiation from $10^{-6}$ to $10^{-8}$ s. During recording, the material reflection factor varies from about 40% to about 8% in case said material is exposed to argon laser radiation. A continuous exposure (from 200 to 300 hours) of this material to actinic radiation with the power density of less than $5.10^{-4}$ W/cm$^2$ causes neither changes of the characteristics thereof nor distortion of the information recorded thereon.

The radiation-sensitive material described hereinabove was used for recording binary signals. The information recorded on this radiation-sensitive material represent a sequence of areas with an unchanged and changed reflection factors, corresponding to the binary code of the information being recorded. The information was recorded upon the material by pulses ($10^{-6}$ sec) of a focused radiation of the argon laser. The laser beam was focused through the transparent support backing. The diameter of the dots recorded upon the material was from 1.5 to 2 microns with a distance between the centers thereof ranging from 3.5 to 4 microns. The information recorded upon the radiation-sensitive material was repeatedly read out by radiation with a power density of less than $5.10^{-4}$ W/cm$^2$, the number of readings being practically unlimited.

EXAMPLE 2

The radiation-sensitive material comprises a support backing made of hot-polished glass, 3 mm thick, and disposed in succession thereon an inorganic material layer made of a compound $As_2Se_3$, 500 Å thick, a separation layer made of silicon monoxide SiO, 300 Å thick, and a metallic layer 2,500 Å thick made of copper. The radiation-sensitive material was prepared substantially as in Example 1.

The energy density required for recording a binary unit on this material is $10^{-1}$ J/cm$^2$ with a pulse duration of actinic radiation from $10^{-7}$ to $10^{-8}$ s. During recording the material reflection factor varies from about 40% to about 10% in case said material is exposed to an argon laser radiation.

A continuous exposure (from 200 to 300 hours) of the material to actinic radiation with a power density less than $10^{-3}$ W/cm$^2$ causes neither changes of the characteristics thereof nor distortion of the information recorded thereon.

The radiation-sensitive material described hereinabove was used for recording binary signals. The information was recorded upon the material by pulses ($10^{-8}$ sec) of a focused laser radiation, applied on the side of the transparent support. The information recorded on the material in the form of dots having changed reflection factors and diameters from 1.5 to 2 microns with a distance between the centers thereof being from 3.5 to 4 microns, was repeatedly read out by radiation with a power density less than $10^{-3}$ W/cm$^2$. The number of readings is unlimited.

EXAMPLE 3

Figure 1:
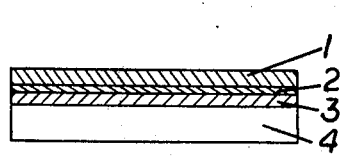
FIG. 1 is a cross-sectional view of a radiation-sensitive material according to the invention.

The radiation-sensitive material comprises a support backing 5 mm thick made of hot-polished glass, and disposed in succession thereon a metallic layer 4000 Å thick made of silver, a separation layer made of germanium, 50 Å thick, and an inorganic material layer made of a compound, $As_2S_3$, 300 Å thick. The radiation-sensitive material was prepared as follows and is illustrated in FIG. 1. First, the metallic layer 3 was deposited by means of thermal evaporation at a pressure of $2.10^{-5}$ mm Hg over the preliminarily cleaned support backing 4, then the separation layer 2 was deposited, and finally the inorganic material layer 1 was deposited by means of thermal evaporation at a pressure of $2.10^{-5}$ mm Hg.

This radiation-sensitive material is characterized by the same sensitivity as that illustrated by example I.

Recording information on the material is done in a similar manner as in Example 3.

EXAMPLE 4

The radiation-sensitive material comprises a support backing 3 mm thick made from polished glass, and disposed in succession thereover an inorganic material layer 400 Å thick made from a compound $As_2Se_3$, a separation layer 280 Å thick made from antimony, and a metallic layer 3000 Å thick made from silver.

The material was produced in the same way as in Example 1 and features the same sensitivity as the material in Example 1.

Recording information on this material was done as in Example 2.

EXAMPLES 5-10

The radiation-sensitive materials were produced in the same way as in Example 2. Information on the basic materials used and the thickness of the layers deposited on the support backing 5 mm thick made of copying glass, as well as test results of these radiation-sensitive materials are given in Table 1.

TABLE 1

| Basic materials and thickness of layers | | | Irradiation pulse length, C | Sensitivity, J/cm$^2$ | Reflection factor | | Dimensions of recorded dots, microns |
|---|---|---|---|---|---|---|---|
| Inorganic material layer | Separation layer | Metallic layer | | | before irradiation, % | after irradiation, % | |
| As$_2$Se$_3$-300 Å | SiO-70 Å | Tl-2000 Å | $10^{-6}$–$10^{-8}$ | $5 \cdot 10^{-2}$ | 40 | 5 | 1.2–1.5 |
| Sb$_2$Se$_3$-400 Å | As$_2$O$_3$-50 Å | Ni-4000 Å | $10^{-6}$–$10^{-8}$ | $5 \cdot 10^{-2}$ | 35 | 4 | 1.2–1.5 |
| As$_2$S$_3$-300 Å | SbO-60 Å | Ag-3000 Å | $10^{-6}$–$10^{-8}$ | $5 \cdot 10^{-2}$ | 42 | 6 | 1.2–1.5 |
| Bi$_2$S$_3$-300 Å | Sb-200 Å | Tl-2000 Å | $10^{-7}$–$10^{-8}$ | $10^{-1}$ | 40 | 4 | 1.2–1.5 |
| Bi$_2$S$_3$-350 Å | Sb-100 Å | Cu-3000 Å | $10^{-7}$–$10^{-8}$ | $5 \cdot 10^{-2}$ | 32 | 3 | 1.2–1.5 |
| As$_2$Se$_2$-400 Å | SbO-250 Å | Cu-2000 Å | $10^{-7}$–$10^{-8}$ | $10^{-1}$ | 40 | 4 | 1.2–1.5 |

EXAMPLE 11

The radiation-sensitive material comprises a support backing made of polished glass 3 mm thick, and disposed in succession thereon an inorganic material layer 800 Å thick made of As$_2$Se$_3$, a separation layer 250 Å thick made of titanium dioxide, and a metallic layer 3000 Å thick made of copper. The radiation-sensitive material was produced as follows: first, the inorganic material layer was deposited with the aid of thermal evaporation at a pressure of $2 \cdot 10^{-5}$ mm Hg on the preliminarily cleaned support backing and, then, the separation layer and metallic layer were deposited by means of electron beam evaporation.

Recording information on the material thus obtained was effected in the same way as in Example 2.

It features the same sensitivity as the material in Example 1.

EXAMPLES 12-16

The radiation-sensitive materials were produced in the same way as in Example 11. Information on the basic materials used and the thickness of the layers deposited on the support backing 3 mm thick made of polished glass, as well as the test result of these materials are given in Table 2.

TABLE 2

| Basic materials and thickness of layers | | | Irradiation pulse, length, C | Sensitivity, J/cm$^2$ | Reflection factor | | Dimensions of recorded dots, microns |
|---|---|---|---|---|---|---|---|
| Inorganic material layer | Separation layer | Metallic layer | | | before irradiation % | after irradiation % | |
| AsS$_2$-3000 Å | Al$_2$O$_3$-60 Å | Cu-2000Å | $10^{-6}$–$10^{-8}$ | $5 \cdot 10^{-2}$ | 35 | 5 | 1.2–1.5 |
| As$_2$Se$_3$-500 Å | Al$_2$O$_3$-270 Å | Tl-2000Å | $10^{-7}$–$10^{-8}$ | $10^{-1}$ | 40 | 4 | 1.2–1.5 |
| Sb$_2$Se$_3$-400 Å | V$_2$O$_5$-100 Å | Ag-3000Å | $10^{-7}$–$10^{-8}$ | $5 \cdot 10^{-2}$ | 38 | 3 | 1.2–1.5 |
| Bi$_2$S$_3$-400 Å | Fe$_2$O$_3$-100 Å | Ag-3000Å | $10^{-6}$–$10^{-8}$ | $6 \cdot 10^{-2}$ | 40 | 4 | 1.2–1.5 |
| As$_2$Se$_3$-300 Å | TlO$_2$-60 Å | Ag-3000Å | $10^{-6}$–$10^{-8}$ | $5 \cdot 10^{-2}$ | 42 | 5 | 1.2–1.5 |

EXAMPLE 17

The radiation-sensitive material comprises a support backing made of hot-polished glass, 5 mm thick, and disposed in succession thereon a metallic layer 3000 Å thick made of silver, a separation layer 100 Å thick made of polymethylsiloxane, and an inorganic material layer 400 Å thick made of an alloy As S$_{0.5}$ Se$_{1.5}$. The radiation-sensitive material was prepared as follows. First, the metallic layer was deposited with the aid of thermal evaporation at a pressure of $2 \cdot 10^{-5}$ mm Hg on the preliminary cleaned support backing, then, by decomposition in a glow discharge at a pressure of $10^{-2}$ mm Hg, there was deposited the separation layer and finally by means of thermal evaporation at a pressure of $2 \cdot 10^{-5}$ mm Hg the inorganic material layer was deposited thereover.

The resulting material is characterized by the same sensitivity as that illustrated by Example 1.

The radiation-sensitive material described hereinabove was used for recording binary signals. The information was recorded upon the material by focused pulses of actinic laser radiation (from $10^{-7}$ to $10^{-8}$ sec.), applied on the side of the inorganic material layer. The information recorded on this material in the form of dots with a changed reflection factor and a diameter from 1.2 to 1.5 microns, with a distance between the centers thereof being from 3.5 to 4 microns, can be read out an unlimited number of times employing radiation with a power density less than $10^{-3}$ W/cm$^2$.

EXAMPLE 18

The radiation-sensitive material comprises a support backing 5 mm thick made from polished glass, and disposed in succession thereover a metallic layer 3000 Å thick made from copper, a separation layer 250 Å thick made from polymethylsiloxane, and an inorganic material layer 500 Å thick made from As$_2$Se$_3$. The material was obtained in a similar manner as in Example 17.

It features the same sensitivity as the material in Example 2.

Recording information on this material was done like in Example 17.

EXAMPLE 19

The radiation-sensitive material comprises a support backing 10 mm thick made of polished quartz, and disposed in succession thereon a metallic layer 300 Å thick, made of silver, a separation layer 20 Å thick made of molybdenum, and an inorganic material layer 400 Å thick made of As$_2$S$_3$. The radiation-sensitive material was prepared as follows. First, the metallic layer was deposited by the use of thermal evaporation at a pressure of $2.10^{-5}$ mm Hg, on the preliminarily cleaned support backing, then the separation layer was deposited by ion plasma spraying and, finally, the inorganic material layer was deposited by means of a thermal evaporation at a pressure of $2.10^{-5}$ mm Hg.

This radiation-sensitive material is characterized by the same sensitivity as that illustrated by Example 1.

Recording information on the material is done in the same way as in Example 2.

EXAMPLE 20

The radiation-sensitive material comprises a support backing 5 mm thick made of polished glass, and disposed in succession thereon a metallic layer 2,500 Å thick made of copper, a separation layer 100 Å thick made of molybdenum, and an inorganic layer made of an alloy $AsS_{0.5}Se_{1.5}$, 500 Å thick. This radiation-sensitive material was prepared in the same way as described in Example 19.

The above radiation-sensitive material is characterized by the same sensitivity as that illustrated by Example 2.

The radiation-sensitive material described hereinabove was used for recording binary signals. The information was recorded upon the material by focused pulses (from $10^{-7}$ to $10^{-8}$ s) of a laser beam applied on the side of the inorganic material layer. The information recorded on the material in the form of dots having changed reflection factors and a diameter of from 1.2 to 1.5 microns, with a distance between the centers thereof being from 3.5 to 4 microns, can be read out an unlimited number of times employing radiation with a power density of less than $10^{-3}$ W/cm$^2$.

EXAMPLE 21

The radiation-sensitive material comprises a support backing 5 mm thick made from polished glass, and disposed in succession thereover a metallic layer 3000 Å thick made of silver, a separation layer 50 Å thick made of platinum, and an inorganic material layer 450 Å thick made from $As_2Se$. This radiation-sensitive material was prepared in the same manner as in Example 19.

The resultant material features the same sensitivity as the material in Example 2.

Recording information was done in the same way as in Example 2.

EXAMPLE 22

The radiation-sensitive material comprises a support backing 10 mm thick made from a polished quartz, and disposed in succession thereover a metallic layer 3000 Å thick made from copper, a separation layer 30 Å thick made from titanium, and an inorganic material layer 300 Å thick made from an alloy $AsS_{0.5}Se_{1.5}$.

This material was prepared in a similar manner as in Example 19 and features the same sensitivity as the material obtained in Example 2.

Recording information was done in the same way as in Example 2.

EXAMPLE 23

The radiation-sensitive material comprises a support backing 3 mm thick made from polished glass, and disposed in succession thereover an inorganic material layer 300 Å thick made from $As_2Se_3$, a separation layer 30 Å thick made from yttrium, and a metallic layer 3000 Å thick made from silver. The material was obtained in a similar manner as in Example 11. It features the same sensitivity as the material in Example 2. Recording information on the material was done as in Example 2.

EXAMPLE 24

The radiation-sensitive material comprises a support backing 3 mm thick made from polished glass, and disposed in succession thereover an inorganic material layer 500 Å thick made from $As_2Se_3$, a separation layer 3 100 Å thick, made from bismuth, and a metallic layer 4000 Å thick made from copper. The material was prepared in the same manner as in Example 1, and features the same sensitivity as the material in Example 2.

Recording information was done in the same way as in Example 1.

EXAMPLES 25-32

The radiation-sensitive materials were produced in the same way as in Example 11. Information on the basic materials used and the thickness of the layers deposited on the support backing of 3 mm thick made polished glass, as well as the test results of these materials are given in Table 3.

The proposed radiation sensitive material and the method of recording information on this material provide a high reliability of recording and reading information, protection from incident radiation having a power density less than $5.10^{-4}$ W/cm$^2$, low consumption of energy for recording information, which allow said material to be effectively used in optical recording devices for recording binary information.

TABLE 3

| Basic materials and thickness of layers | | | Irradiation pulse length, C | Sensitivity, J/cm$^2$ | Reflection factor | | Dimensions of recorded dots, microns |
| --- | --- | --- | --- | --- | --- | --- | --- |
| Inorganic material layer | Separation layer | Metallic layer | | | before irradiation, % | after irradiation, % | |
| AsSe$_2$-400 Å | V-30 Å | Ni-2000 Å | $10^{-6}$–$10^{-8}$ | $5 . 10^{-2}$ | 42 | 4 | 1.2–1.5 |
| Bi$_2$S$_3$-500 Å | Ti-80 Å | Ag-3000 Å | $10^{-7}$–$10^{-8}$ | $10^{-1}$ | 32 | 3 | 1.2–1.5 |
| As$_2$S$_3$-300 Å | Y-90 Å | Cu-3000 Å | $10^{-7}$–$10^{-8}$ | $10^{-1}$ | 35 | 5 | 1.2–1.5 |
| Sb$_2$Se$_3$-350 Å | Pt-20 Å | Cu-3000 Å | $10^{-6}$–$10^{-8}$ | $5 . 10^{-2}$ | 40 | 5 | 1.2–1.5 |
| Bi$_2$Se$_3$-400 Å | Pt-90 Å | Ag-2000 Å | $10^{-7}$–$10^{-8}$ | $10^{-1}$ | 35 | 4 | 1.2–1.5 |
| AsSe$_2$-300 Å | Rh-30 Å | Tl-4000 Å | $10^{-6}$–$10^{-8}$ | $5 . 10^{-2}$ | 35 | 4 | 1.2–1.5 |
| Sb$_2$S$_3$-300 Å | Rh-100 Å | Cu-2000 Å | $10^{-7}$–$10^{-8}$ | $10^{-1}$ | 42 | 5 | 1.2–1.5 |

We claim:

1. A method for recording information on a radiation-sensitive material comprising a metallic layer made of a metal selected from the group consisting of silver, copper, nickel, thallium and their alloys, an inorganic material layer made of material selected from the group consisting of arsenic chalcogenide, antimony chalcogenide, and bismuth chalcogenide, and a separation layer disposed between said metallic layer and said inorganic material layer and made from a material being inert relative to said metallic layer and said inorganic material layer, said separation layer having a thickness of from 50 to 300 Å and made of a material selected from the group consisting of As, Sb, Si, Ge, and their oxides, and oxides of Al, Ti, V, Fe, and polyorganosiloxane films, said method comprising irradiation of the radiation-sensitive material by pulses of actinic radiation of a duration from $10^{-6}$ to $10^{-8}$ s with an energy density in the area exposed to radiation being not less than $5.10^{-2}$ J/cm$^2$, said pulses being capable of producing in the exposed area of the radiation-sensitive material a potential difference between said metallic layer and said inorganic material layer so as to cause an electric breakdown of said separation layer in said area.

2. A method for recording information on a radiation-sensitive material incorporating a metallic layer made of a metal selected from the group consisting of silver, copper, nickel, thallium and their alloys, an inorganic material layer made of material selected from the group consisting of arsenic chalcogenide, antimony chalcogenide, and bismuth chalcogenide, and a separation layer disposed between said metallic layer and said inorganic material layer and made from a material being insert relative to said metallic layer and said inorganic material layer, said separation layer having a thickness of from 20 to 100 Å and made of a metal selected from the group consisting of bismuth, the platinum group and the secondary subgroup of the third, fourth, fifth and sixth groups of the periodic system, said method comprising irradiation of the radiation-sensitive material by pulses of actinic radiation of a duration from $10^{-6}$ to $10^{-8}$ s with an energy density in the area exposed to radiation being not less than $5.10^{-2}$ J/cm$^2$, said pulses being capable of producing in the exposed area of the radiation-sensitive material a potential difference between said metallic layer and said inorganic material layer so as to case an electric breakdown of said separation layer in said area.

* * * * *